(12) United States Patent
Hirayama et al.

(10) Patent No.: US 8,125,863 B2
(45) Date of Patent: Feb. 28, 2012

(54) INTEGRATED CIRCUIT, INFORMATION RECORDING/REPRODUCING APPARATUS, AND SIGNAL PROCESSING METHOD

(75) Inventors: Atsushi Hirayama, Osaka (JP); Masaharu Imura, Osaka (JP); Masamitsu Mimura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/908,277

(22) Filed: Oct. 20, 2010

(65) Prior Publication Data

US 2011/0032808 A1    Feb. 10, 2011

Related U.S. Application Data

(63) Continuation of application No. PCT/JP2009/001048, filed on Mar. 9, 2009.

(30) Foreign Application Priority Data

May 22, 2008   (JP) ................................. 2008-133940

(51) Int. Cl.
  *G11B 7/00*  (2006.01)
(52) U.S. Cl. ................. 369/47.11; 369/47.27; 369/47.31
(58) Field of Classification Search ............... 369/47.31, 369/47.11, 47.27, 47.1, 47.21, 47.22, 47.25, 369/47.3, 47.42, 47.48, 53.1, 53.24, 53.29
See application file for complete search history.

(56) References Cited

U.S. PATENT DOCUMENTS

| 5,563,862 A | 10/1996 | Udagawa |
| 6,269,059 B1 | 7/2001 | Kuroda et al. |
| 6,775,214 B2 | 8/2004 | Suzuki |
| 7,388,820 B2 * | 6/2008 | Maeda ...................... 369/53.23 |
| 2003/0058760 A1 | 3/2003 | Kuroda et al. |
| 2006/0077804 A1 | 4/2006 | Kitagawa |
| 2006/0133242 A1 | 6/2006 | Miyata |

FOREIGN PATENT DOCUMENTS

| JP | 8-50722 A | 2/1996 |
| JP | 11-3454962 A | 12/1999 |
| JP | 2001-338476 A | 12/2001 |
| JP | 2006-179088 A | 7/2006 |

* cited by examiner

*Primary Examiner* — Nabil Hindi
(74) *Attorney, Agent, or Firm* — McDermott Will & Emery LLP

(57) ABSTRACT

An information recording/reproducing apparatus including an optical pickup unit for generating an RF signal performs signal processing to acquire, at a restart of recording after a halt of recording, a data ID to be used as a reference for specifying a recording restart position in the recording medium based on the RF signal. The signal processing includes reproduced signal generation processing to generate a reproduced signal based on the RF signal, and data ID acquisition determination processing to determine, at the restart of recording after the halt of recording, whether or not the data ID has been properly acquired, based on the reproduced signal. If it is determined in the data ID acquisition determination step that the data ID has not been properly acquired, a reproduction parameter to be used for generating the reproduced signal in the reproduced signal generation step is adjusted.

12 Claims, 5 Drawing Sheets

INTEGRATED CIRCUIT, INFORMATION RECORDING/REPRODUCING APPARATUS, AND SIGNAL PROCESSING METHOD

CROSS-REFERENCE TO RELATED APPLICATION

This is a continuation of PCT International Application PCT/JP2009/001048 filed on Mar. 9, 2009, which claims priority to Japanese Patent Application No. 2008-133940 filed on May 22, 2008. The disclosures of these applications including the specifications, the drawings, and the claims are hereby incorporated by reference in its entirety.

BACKGROUND

The present disclosure relates to a technique for recording information on a recording medium such as an optical disc and the like.

As a conventional information recording/reproducing apparatus, an apparatus in which data recording onto an entire surface of an optical disc is halted, an asymmetry value is calculated for a data-recorded region in which data has been recorded immediately before the halt, and a recording power after a restart of recording based on the calculated asymmetry value has been known.

Also, Japanese Patent Publication No. 2006-179088 discloses a technique for adjusting a boost amount of an equalizer circuit during reproduction.

SUMMARY

In the conventional information recording/reproducing apparatus, when recording is restarted, a data ID is read from an optical disc, and a recording restart position is specified using the data ID as a reference. Therefore, if a data ID is not properly read, recording cannot be restarted.

Specifically, on an outer circumference of a single layer optical disc on which constant angular velocity (CAV) recording has been performed, recording quality is lowered since recording has been performed at a high linear velocity thereto, compared to an inner circumference, and therefore, it is highly likely that a data ID cannot be properly read.

Also, in a multilayer optical disc, second and subsequent layers tend to have lower recording quality than that of a first layer, and therefore, it is highly likely that a data ID cannot be properly read on the second and subsequent layers.

In view of the foregoing, it is an object of the present disclosure to prevent, in an information recording/reproducing apparatus, an error in which recording cannot be restarted when recording is halted from occurring.

To solve the above-described problems, a first embodiment of the present invention is directed to signal processing to acquire, in an information recording/reproducing apparatus including an optical pickup unit for receiving reflected light of laser light with which a recording medium has been irradiated and thereby generating an RF signal, at a restart of recording after a halt of recording, a data ID to be used as a reference for specifying a recording restart position in the recording medium, based on the RF signal. The signal processing includes reproduced signal generation processing to generate a reproduced signal based on the RF signal, and data ID acquisition determination processing to determine, at the restart of recording after the halt of recording, whether or not the data ID has been properly acquired, based on the reproduced signal. If it is determined in the data ID acquisition determination processing that the data ID has not been properly acquired, a reproduction parameter to be used for generating the reproduced signal in the reproduced signal generation processing is adjusted.

According to the first embodiment, if the data ID has not been properly acquired, the reproduction parameter to be used for generating the reproduced signal is adjusted. Thus, the data ID can be properly acquired (reproduced) with a higher rate of success. Therefore, an error where recording cannot be restarted when recording is halted can be prevented. Also, when the information recording/reproducing apparatus is configured so that recording is retried when the data ID cannot be read, the number of times of retrying recording is reduced, and thus, a recording time is reduced.

A second embodiment of the present invention is directed to signal processing to acquire, in an information recording/reproducing apparatus including an optical pickup unit for receiving reflected light of laser light with which a recording medium has been irradiated and thereby generating an RF signal, at a restart of recording after a halt of recording, a data ID to be used as a reference for specifying a recording restart position in the recording medium, based on the RF signal. The signal processing includes reproduced signal generation processing to generate a reproduced signal based on the RF signal, and equalizing processing to cut a component of the RF signal exceeding a predetermined cutoff frequency and perform boosting to the RF signal based on a predetermined boost amount. During a period from a start of the halt of recording to the restart of recording, an asymmetry value is calculated based on an RF signal obtained by irradiating a data-recorded region of the recording medium in which data has been recorded before the halt of recording with laser light, and a recording power after the restart of recording is calculated based on the calculated asymmetry value. If the calculated asymmetry value is smaller than a first threshold, the predetermined boost amount is increased, and if the asymmetry value is larger than a second threshold, the predetermined boost amount is reduced.

Our experiments have showed that when the asymmetry value is small, the amplitude of a short mark pattern is small, and therefore, it is easier to acquire the data ID if the boost amount in the equalizing processing is large. When the asymmetry value is large, on the other hand, the amplitude of a short mark pattern is large, and therefore, it is easier to acquire the data ID if the boost amount in the equalizing processing is small. According to the second embodiment, when the asymmetry value is smaller than the first threshold, the boost amount is adjusted to be large, and when the asymmetry value is larger than the second threshold, the boost amount is adjusted to be small. Thus, the data ID can be properly acquired with a higher rate of success. Therefore, an error where recording cannot be restarted when recording is halted can be prevented. When the information recording/reproducing apparatus is configured so that recording is retried when the data ID cannot be read, the number of times of retrying recording is reduced, and thus, a recording time is reduced.

According to the present disclosure, in an information recording/reproducing apparatus, an error where recording cannot be restarted when recording is halted can be prevented. Moreover, when the information recording/reproducing apparatus is configured so that recording is retried when the data ID cannot be read, the number of times of retrying recording is reduced, and thus, a recording time is reduced. The above-described advantages can be markedly observed, in particular, when a high-speed recording is performed, when recording is performed to a multilayer optical disc or a poor quality disc, and the like.

DETAILED DESCRIPTION

Embodiments of the present invention will be hereinafter described with reference to the accompanying drawings.

<<First Embodiment>>

Figure 1:
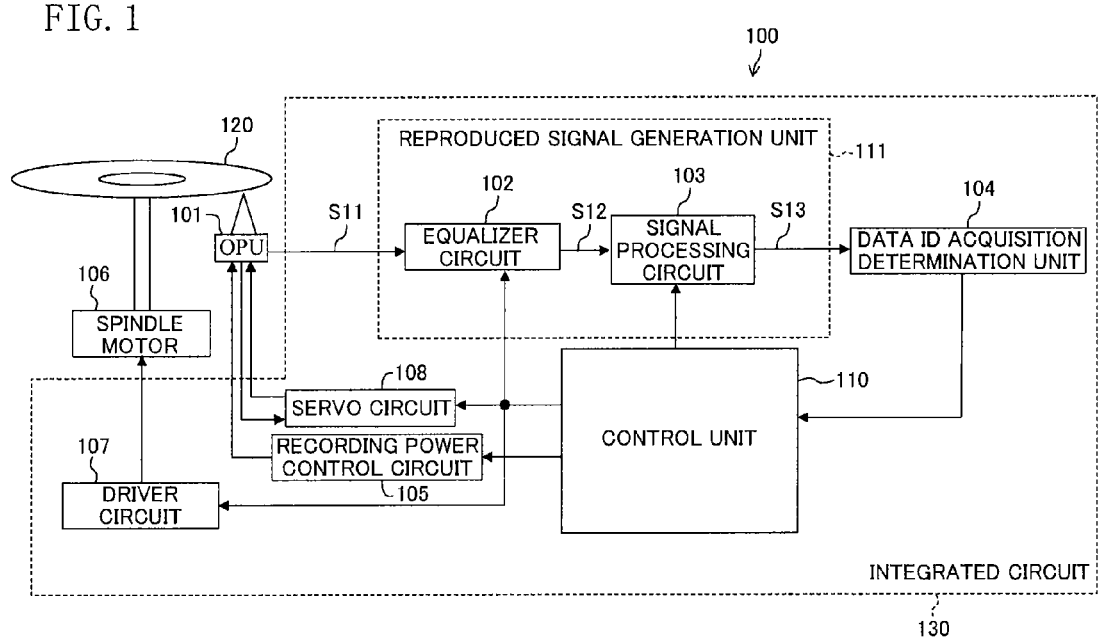
FIG. 1 is a block diagram illustrating a configuration of an optical disc apparatus according to a first embodiment of the present invention.

As shown in FIG. 1, an optical disc apparatus (information recording/reproducing apparatus) 100 according to a first embodiment of the present invention includes an optical pickup unit (OPU) 101, a reproduced signal generation unit 111, a data ID acquisition determination unit 104, a recording power control circuit 105, a spindle motor 106, a driver circuit 107, a servo circuit 108, and a control unit 110. In the optical disc apparatus 100, an optical disc (recording medium) 120 is set as a recording medium. The reproduced signal generation unit 111, the data ID acquisition determination unit 104, the recording power control circuit 105, the driver circuit 107, the servo circuit 108, and control unit 110 together form an integrated circuit 130.

The optical pickup unit 101 outputs laser light to irradiate the optical disc 120 with the laser light, and receives reflected light of the laser light to generate an RF signal S11.

The reproduced signal generation unit 111 generates a reproduced signal S13 based on the RF signal S11, and includes an equalizer circuit 102 and a signal processing circuit 103. When a region of the optical disc 120 in which a data ID is recorded is irradiated with laser light, the reproduced signal S13 including the data ID is generated by the reproduced signal generation unit 111. That is, the data ID is acquired by the reproduced signal generation unit 111.

The equalizer circuit 102 adjusts a frequency characteristic of the RF signal S11 generated by the optical pickup unit 101 to output the adjusted RF signal as an RF signal S12. By this adjustment, a component exceeding a cutoff frequency set by the control unit 110 is cut, and boosting is performed based on a boost amount set by the control unit 110.

The signal processing circuit 103 extracts main data, a data ID, an ID error detection (IED) code, and the like from the RF signal S12, to which frequency characteristic adjustment has been performed by the equalizer circuit 102, to output the processed signal as a reproduced signal S13. More specifically, for example, when the optical disc 120 is a DVD-R, the RF signal S12 (analog signal) output by the equalizer circuit 102 is binarized (digitalized), and then, a 8-16 modulation data with a synchronization signal is demodulated. Furthermore, error correction code (ECC) modulation and descramble are performed to the RF signal S12, thereby extracting the main data, the data ID, and the IED code. Then, the reproduced signal S13 indicating information containing the main data, the data ID, and the IED code is output.

The data ID acquisition determination unit 104 determines, based on the reproduced signal S13 output by the signal processing circuit 103, whether or not the data ID has been properly acquired (reproduced). Specifically, the data ID acquisition determination unit 104 determines, based on the data ID and the IED code contained in information indicated by the reproduced signal S13, whether or not the data ID has been properly acquired.

The recording power control circuit 105 controls a recording power. Thus, the intensity of laser light output by the optical pickup unit 101 is controlled.

The spindle motor 106 rotates the optical disc 120.

The driver circuit 107 controls the rotation of the spindle motor 106.

The servo circuit 108 performs focus servo control in which an objective lens provided to the optical pickup unit 101 is moved in a direction in which the objective lens is brought in contact with the optical disc 120 or is separated from the optical disc 120, and tracking servo control in which the objective lens is moved along a radius of the optical disc 120.

The control unit 110 controls the operation of each of the equalizer circuit 102, the signal processing circuit 103, the recording power control circuit 105, the driver circuit 107, and the servo circuit 108.

Figure 2:
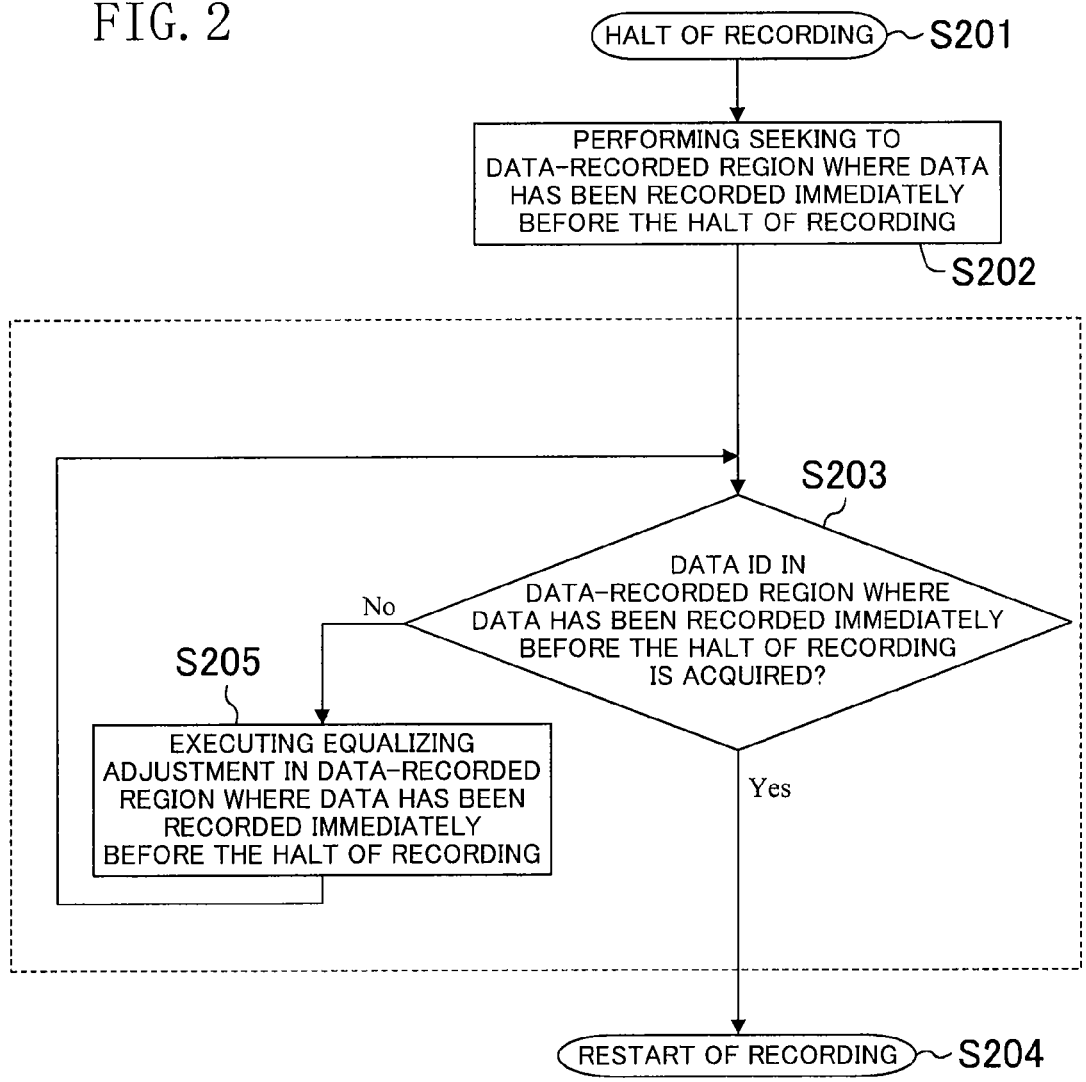
FIG. 2 is a flowchart to show an operation of the optical disc apparatus of the first embodiment when recording is halted.

Now, the operation of the optical disc apparatus 100 having the above-described configuration when a recording is halted will be described with a flowchart of FIG. 2.

In Step S201, the optical disc apparatus 100 halts recording.

In Step S202, the optical disc apparatus 100 performs seeking so that a region in which the data ID has been recorded immediately before Step S201, i.e., immediately before a halt of recording is irradiated with a light beam.

In Step S203, the data ID acquisition determination unit 104 determines, based on the reproduced signal S13 output by the signal processing circuit 103, whether or not the data ID has been properly acquired. Specifically, the data ID acquisition determination unit 104 determines, based on a data ID and an IED code contained in information indicated by the reproduced signal S13, whether or not the data ID has been properly acquired. If it is determined that the data ID has been properly acquired, the process proceeds to Step S204 and, if it is determined that the data ID has not been properly acquired, the process proceeds to Step S205.

In Step S204, the optical disc apparatus 100 specifies, using as a reference the acquired data ID, i.e., the data ID recorded immediately before the halt of recording, a recording restart position in the optical disc 120. Then, recording is restarted at the specified recording restart position. The recording restart position is specified, for example, at a recording position corresponding to a subsequent data ID to the data ID recorded immediately before the halt of recording.

In Step 205, the control unit 110 adjusts a cutoff frequency and a boost amount to be used in the equalizer circuit 102. Specifically, the region in which the data ID has been recorded immediately before the halt of recording is reproduced while the boost amount to be used in the equalizer circuit 102 is changed to different amounts, and the boost amount with which an index such as a jitter of the RF signal, an error rate, and the like is optimal is set as the boost amount to be used in the equalizer circuit 102. Also, the cutoff frequency is adjusted in the same manner as in adjusting the boost amount.

As described above, according to this embodiment, if the data ID has not been properly acquired, the cutoff frequency and the boost amount to be used in the equalizer circuit 102 are adjusted. Thus, the data ID can be properly acquired (reproduced) with a higher rate of success, so that an error where recording cannot be restarted when recording is halted is prevented. Also, when the optical disc apparatus 100 is configured so that recording is retried when the data ID cannot be read, the number of times of retrying recording is reduced by this embodiment, and thus, a recording time is reduced.

<<Second Embodiment>>

Figure 3:
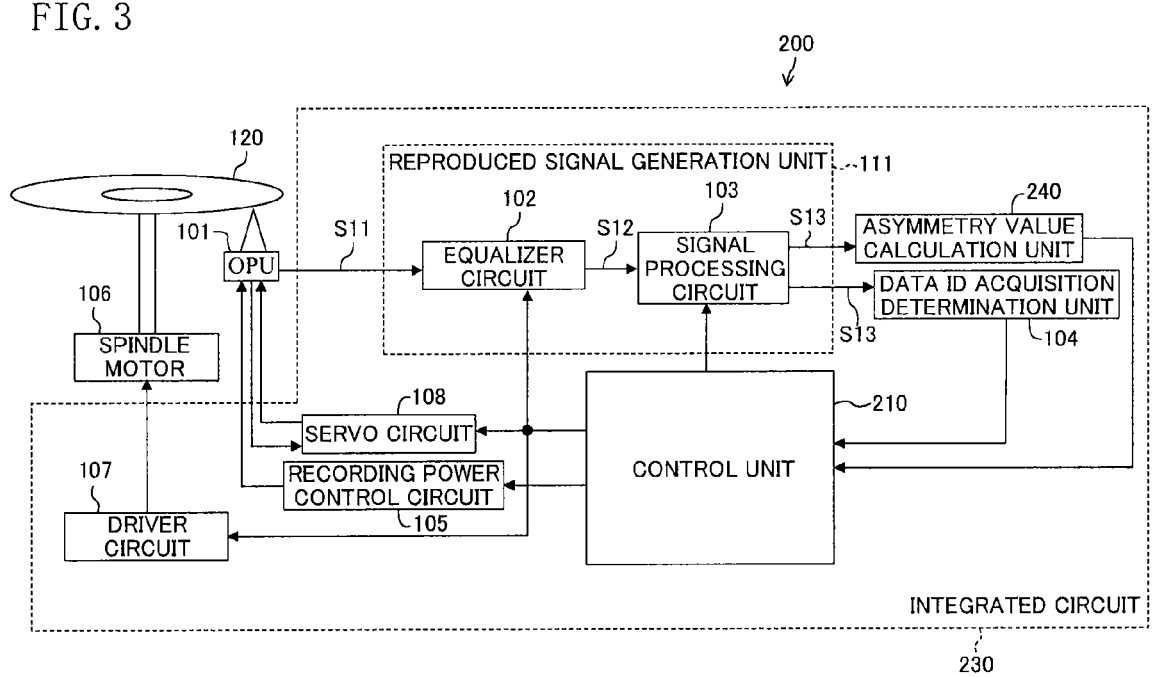
FIG. 3 is a block diagram illustrating a configuration of an optical disc apparatus according to a second embodiment of the present invention.

As shown in FIG. 3, an optical disc apparatus 200 according to a second embodiment of the present invention includes an integrated circuit 230, instead of the integrated circuit 130 of the first embodiment. The integrated circuit 230 includes an asymmetry value calculation unit 240, in addition to the components of the integrated circuit 130. The asymmetry value calculation unit 240 calculates an asymmetry value based on the reproduced signal S13 output by the signal processing circuit 103. The integrated circuit 230 includes a control unit 210 for performing a different control operation from the control operation of the control unit 110 of the first embodiment. Other than that, the configuration of the optical disc apparatus 200 is the same as that of the optical disc apparatus 100 of the first embodiment, and therefore, the detail description thereof will be omitted.

Figure 4:
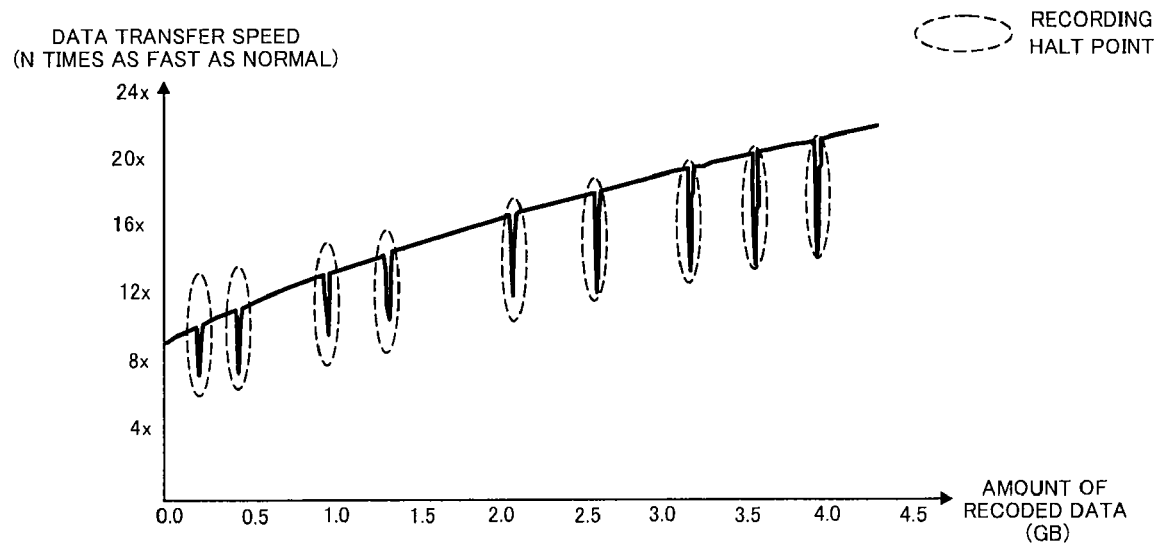
FIG. 4 is a graph showing the relationship between data transfer rate and recorded data amount when CAV recording is performed on an entire surface of the optical disc according to the second embodiment.

When the optical disc apparatus 200 having the above-described configuration performs constant angular velocity (CAV) recording on an entire surface of the optical disc 120, a data transfer rate is, for example, as shown in FIG. 4. In FIG. 4, the ordinate indicates how many times as fast as a reference data transfer rate 1× the data transfer rate is, and the abscissa indicates the amount of accumulated recorded data from a start of recording at an inner circumference of an optical disc in terms of GB (gigabytes). In this example, the optical disc apparatus 200 halted recording nine times during a period from a time when recording was started at an inner circumference of the optical disc 120 to a time when recording on an entire surface of the optical disc 120 was completed at an outer circumference of the optical disc 120. As each part encircled by a dotted line of FIG. 4 shows, the data transfer rate dropped temporarily each time recording was halted.

Figure 5:
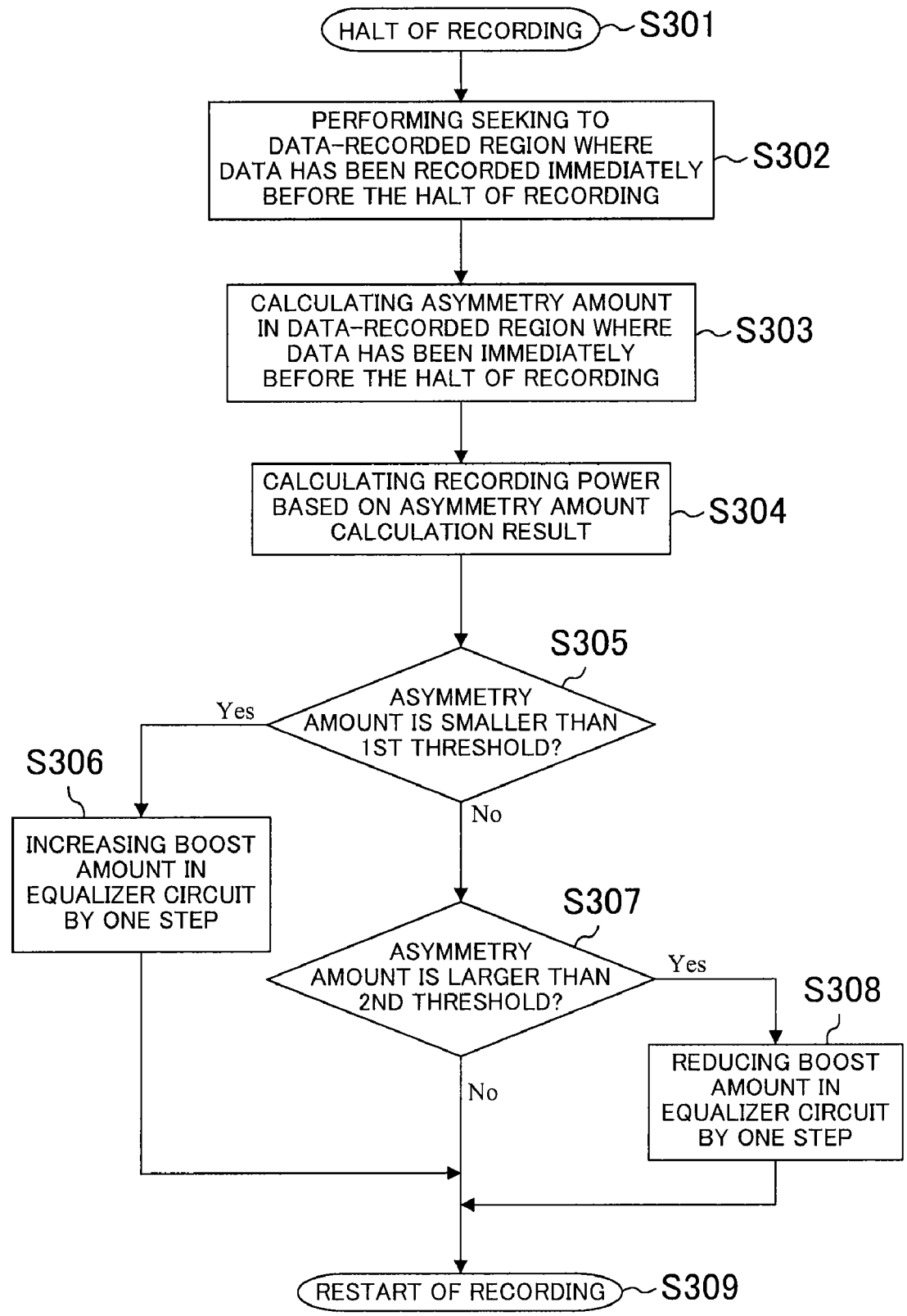
FIG. 5 is a flowchart showing the operation of the optical disc apparatus of the second embodiment when recording is halted.

The operation of the optical disc apparatus 200 of this embodiment when recording is halted will be described with reference to a flowchart of FIG. 5.

In Step S301, the optical disc apparatus 200 halts recording.

In Step S302, the optical disc apparatus 200 performs seeking so that a data-recorded region in which data has been recorded immediately before Step S301, i.e., immediately before a halt of recording is irradiated with laser light.

In Step S303, the optical disc apparatus 200 calculates an asymmetry value based on the RF signal S11 acquired by irradiating the data-recorded region in which data has been recorded immediately before the halt of recording. Specifically, first, the optical pickup unit 101 outputs a light beam to irradiate the data-recorded region with the light beam, thereby obtaining the RF signal S11. Next, the equalizer circuit 102 adjusts a frequency characteristic of the RF signal S11 to output the adjusted RF signal as the RF signal S12. Furthermore, the signal processing circuit 103 performs predetermined signal processing to the RF signal S12 to output the processed signal as the reproduced signal S13. Then, the asymmetry value calculation unit 240 calculates the asymmetry value based on the reproduced signal S13.

In Step S304, the control unit 210 receives the asymmetry value, which has been calculated by the asymmetry value calculation unit 240 in Step S303, to calculate, based on the asymmetry value, a recording power after a restart of recording.

In Step S305, the control unit 210 determines whether or not the asymmetry value calculated by the asymmetry value calculation unit 240 in Step S303 is smaller than a first threshold. If the asymmetry value is smaller than the first threshold, the process proceeds to Step S306. If the asymmetry value is not smaller than the first threshold, the process proceeds to Step S307.

In Step S306, the control unit 210 increases the boost amount to be used in the equalizer circuit 102 by one step. An amount of change in boost amount per step is determined beforehand.

In Step S307, the control unit 210 determines whether or not the asymmetry value calculated by the asymmetry value calculation unit 240 in Step S303 is larger than a second threshold. If the asymmetry value is larger than the second threshold, the process proceeds to Step S308. If the asymmetry value is not larger than the second threshold, the process proceeds to Step S309.

In Step S308, the control unit 210 reduces the boost amount to be used in the equalizer circuit 102 by one step.

In Step S309, the optical disc apparatus 200 specifies a recording restart position in the optical disc 120 using as a reference the data ID which has been recorded immediately before the halt of recording. Then, recording is restarted at the specified recording restart position with the recording power calculated in Step S304.

In this case, the second threshold is equal to or larger than the first threshold.

Note that, in Step S306 and Step S308, the boost amount is changed by one step. However, the boost amount may be changed by two or more steps.

Our experiments have showed that when the asymmetry value is small, the amplitude of a short mark pattern is small, and therefore, it is easier to acquire the data ID if the boost amount of the equalizer circuit 102 is large. When the asymmetry value is large, on the other hand, the amplitude of a short mark pattern is large, and therefore, it is easier to acquire the data ID if the boost amount of the equalizer circuit 102 is small. In this embodiment, when the asymmetry value is smaller than the first threshold, the boost amount is adjusted to be large, and when the asymmetry value is larger than the second threshold, the boost amount is adjusted to be small. Thus, the data ID can be properly acquired with a higher rate of success.

<<Variation of Second Embodiment>>

When whether or not the data ID has been properly acquired is determined during a period after Steps 305-S308 and before Step S309, and a determination result is that the data ID has not been properly acquired, the parameters to be used in the equalizer circuit 102 may be adjusted. That is, Steps S202, S203, and S205 of the first embodiment may be executed during a period after Steps S305-S308 and before Step S309.

<<Other Embodiments>>

Note that, in the first embodiment and the variation of the second embodiment, in Step S205, the cutoff frequency and the boost amount to be used in the equalizer circuit 102 are adjusted. However, only one of the cutoff frequency and the boost amount may be adjusted. Also, not only the cutoff frequency and the boost amount but also other reproduction parameters to be used for generating the reproduced signal S13 in the reproduced signal generation unit 111 may be adjusted to improve the data ID acquisition rate. For example, parameters regarding focus control of the servo circuit 108, parameters regarding tracking control, and the like may be adjusted.

In the second embodiment and the variation of the second embodiment, in Step S302, the optical disc apparatus 200 performs seeking so that a data-recorded region in which data has been recorded immediately before a halt of recording is irradiated with a light beam. However, the region which is irradiated with a light beam is not limited to the region in which recording has been performed immediately before a halt of recording. A region which is located distant from a recording position when recording is halted may be irradiated with a light beam, as long as recording has been performed before a halt of recording in the region.

In the first embodiment and the variation of the second embodiment, a recording restart position is specified using as a reference a data ID which has been recorded immediately before a halt of recording. However, the recording restart position may be specified using as a reference a data ID which has been recorded further before the halt, and it may be determined whether or not the data ID to be used as a reference for the recording restart position has been properly acquired.

Each of an integrated circuit, an information recording/reproducing apparatus, and a signal processing method according to the present disclosure allows a data ID to be properly acquired at a high rate of success, and thus, advantageously, an error where recording cannot be restarted when recording is halted is prevented. Therefore, the present invention is useful to an information recording/reproducing apparatus and the like for recording information on a recording medium such as an optical disc and the like.

What is claimed is:

1. An integrated circuit which acquires, in an information recording/reproducing apparatus including an optical pickup unit for receiving reflected light of laser light with which a recording medium has been irradiated and thereby generating an RF signal, at a restart of recording after a halt of recording, a data ID to be used as a reference for specifying a recording restart position in the recording medium, based on the RF signal, the integrated circuit comprising:
a reproduced signal generation unit configured to generate a reproduced signal based on the RF signal; and
a data ID acquisition determination unit configured to determine, at the restart of recording after the halt of recording, whether or not the data ID has been properly acquired, based on the reproduced signal,
wherein
if the data ID acquisition determination unit determines that the data ID has not been properly acquired, a reproduction parameter to be used for generating the reproduced signal in the reproduced signal generation unit is adjusted.

2. The integrated circuit of claim 1, wherein
the reproduced signal generation unit includes an equalizer circuit configured to cut a component of the RF signal exceeding a predetermined cutoff frequency and perform boosting to the RF signal based on a predetermined boost amount, and
the reproduction parameter is at least one of the predetermined cutoff frequency and the predetermined boost amount.

3. The integrated circuit of claim 1, wherein
during a period from a start of the halt of recording to the restart of recording, an asymmetry value for a data-recorded region of the recording medium in which data has been recorded before the halt of recording is calculated, and a recording power after the restart of recording is calculated based on the calculated asymmetry value.

4. An information recording/reproducing apparatus, comprising:
the integrated circuit of claim 1; and
the optical pickup unit.

5. An integrated circuit which acquires, in an information recording/reproducing apparatus including an optical pickup unit for receiving reflected light of laser light with which a recording medium has been irradiated and thereby generating an RF signal, at a restart of recording after a halt of recording, a data ID to be used as a reference for specifying a recording restart position in the recording medium, based on the RF signal, the integrated circuit comprising:
a reproduced signal generation unit configured to generate a reproduced signal based on the RF signal, and including an equalizer circuit configured to cut a component of the RF signal exceeding a predetermined cutoff frequency and perform boosting to the RF signal based on a predetermined boost amount,
wherein
during a period from a start of the halt of recording to the restart of recording, an asymmetry value for a data-recorded region of the recording medium in which data has been recorded before the halt of recording is calculated, and a recording power after the restart of recording is calculated based on the calculated asymmetry value, and
if the calculated asymmetry value is smaller than a first threshold, the predetermined boost amount is increased, and if the asymmetry value is larger than a second threshold, the predetermined boost amount is reduced.

6. The integrated circuit of claim 5, further comprising:
a data ID acquisition determination unit configured to determine, at the restart of recording after the halt of recording, whether or not the data ID has been properly acquired, based on the reproduced signal,
wherein
if the data ID acquisition determination unit determines that the data ID has not been properly acquired, at least one of the predetermined cutoff frequency and the predetermined boost amount is adjusted.

7. An information recording/reproducing apparatus, comprising:
the integrated circuit of claim 5; and
the optical pickup unit.

8. A signal processing method in which in an information recording/reproducing apparatus including an optical pickup unit for receiving reflected light of laser light with which a recording medium has been irradiated and thereby generating an RF signal, a data ID to be used as a reference for specifying a recording restart position in the recording medium is acquired at a restart of recording after a halt of recording based on the RF signal, the method comprising of:
a reproduced signal generation step of generating a reproduced signal based on the RF signal; and
a data ID acquisition determination step of determining, at the restart of recording after the halt of recording, whether or not the data ID has been properly acquired, based on the reproduced signal,
wherein
if it is determined in the data ID acquisition determination step that the data ID has not been properly acquired, a reproduction parameter to be used for generating the reproduced signal in the reproduced signal generation step is adjusted.

9. The signal processing method of claim 8, wherein
the reproduced signal generation step includes an equalizing step of cutting a component of the RF signal exceeding a predetermined cutoff frequency and performing boosting to the RF signal based on a predetermined boost amount, and
the reproduction parameter is at least one of the predetermined cutoff frequency and the predetermined boost amount.

10. The signal processing method of claim 8, wherein
during a period from a start of the halt of recording to the restart of recording, an asymmetry value for a data-recorded region of the recording medium in which data has been recorded before the halt of recording is calculated, and a recording power after the restart of recording is calculated based on the calculated asymmetry value.

11. A signal processing method in which in an information recording/reproducing apparatus including an optical pickup unit for receiving reflected light of laser light with which a recording medium has been irradiated and thereby generating an RF signal, a data ID to be used as a reference for specifying a recording restart position in the recording medium is acquired at a restart of recording after a halt of recording based on the RF signal, the method comprising of:
a reproduced signal generation step of generating a reproduced signal based on the RF signal, the reproduced signal generating step including an equalizing step of cutting a component of the RF signal exceeding a predetermined cutoff frequency and performing boosting to the RF signal based on a predetermined boost amount,
wherein
during a period from a start of the halt of recording to the restart of recording, an asymmetry value for a data-recorded region of the recording medium in which data has been recorded before the halt of recording is calculated, and a recording power after the restart of recording is calculated based on the calculated asymmetry value, and
if the calculated asymmetry value is smaller than a first threshold, the predetermined boost amount is increased, and if the asymmetry value is larger than a second threshold, the predetermined boost amount is reduced.

12. The signal processing method of claim 11, further comprising:
a data ID acquisition determination step of determining, at the restart of recording after the halt of recording, whether or not the data ID has been properly acquired, based on the reproduced signal,
wherein
if it is determined in the data ID acquisition determination step that the data ID has not been properly acquired, at least one of the predetermined cutoff frequency and the predetermined boost amount is adjusted.

\* \* \* \* \*